United States Patent [19]
Hertel

[11] 3,775,817
[45] Dec. 4, 1973

[54] TURNING TOOL
[76] Inventor: Karl Hertel, Oedenberger Strasse 29, Nuernberg, Germany
[22] Filed: Jan. 11, 1972
[21] Appl. No.: 217,002

[30] Foreign Application Priority Data
Jan. 19, 1971 Germany.................. P 21 02 237.7

[52] U.S. Cl. .................................................. 29/96
[51] Int. Cl. ............................................... B26d 1/00
[58] Field of Search ..................................... 29/96 R

[56] References Cited
UNITED STATES PATENTS
| | | | |
|---|---|---|---|
| 1,239,459 | 9/1917 | Carew | 29/96 |
| 3,545,318 | 12/1970 | Anderson | 29/96 |
| 1,629,667 | 5/1927 | Knipple | 29/96 |
| 1,396,180 | 11/1921 | Fors | 29/96 |
| 3,551,975 | 1/1971 | Novkov | 29/96 |
| 1,700,610 | 1/1929 | Drees | 29/96 |

FOREIGN PATENTS OR APPLICATIONS
175,859 2/1953 Austria .................................. 29/96

Primary Examiner—Harrison L. Hinson
Attorney—George H. Spencer et al.

[57] ABSTRACT

A turning tool which includes a head, to which a cutting edge may be attached, and a mounting for the head such that the principal contact face between the head and the mounting slopes downwardly and towards the forward end of the tool to provide a pressure bearing surface for the pressure transmitted to the head from the cutting edge during operation. In order to help secure the head against sliding motion along this principal contact face an anchoring protuberance is provided on the head to engage in a corresponding recess in the mounting.

18 Claims, 2 Drawing Figures

PATENTED DEC 4 1973 3,775,817

TURNING TOOL

The present invention relates to a turning tool having a cutting edge carried by a head and wherein the head is in turn releasably connected to a mounting.

Much progress in the manufacturing industries is due to ever improved efficiency and accuracy in the machining of metal articles. However, these improvements tend to increased complexity of construction of machines which in turn means that the capital expenditure on such machines is constantly increasing Such large capital outlay, if it is to be justified, must be accompained by widely adaptable machines which are also easy to use.

One of the principle difficulties encountered in prior machines is that of ensuring that when a worn machine tool part is replaced by a new part, the new cutting edge there-after assumes precisely the correct position. It is clearly desirable that the replacement of the part subject to wear can be effected under conditions of confined space. A further problem relates to turning tools which in use are subjected to very high stresses and corresponding temperature rises which may amount to some 1,000°C. It is clearly desirable to avoid the necessity to await cooling before replacing the cutting edges.

The term turning tool as used herein is to be understood to refer quite generally to a machining tool having a cutter carrier. Thus the subject of the invention can be utilized also for cutter-heads, milling cutters or the like, where operations are performed with cutting tools or cutter carriers clamped to a body.

According to the present invention there is provided a turning tool comprising a head releasably connected to a mounting, and said head releasably carrying at a forward end of the tool a cutting edge, wherein the surface of the mounting in contact with the head slopes downwardly towards the forward end and wherein a downwardly projecting protuberance is provided on the head to engage a recess in the mounting. Thus the head is lowered into place from above. Such a construction is of importance inasmuch as, even under conditions of confined space, the surface of a turning tool will generally remain freely accessible in order to allow the swarf to be readily removed. The inclination of the contact areas between mounting and head provides a support for the head against the pressures exerted during machining.

Preferably, the protuberance forms an acute angle with the downwardly adjoining portion of the contact surface. The protuberance and the recess in the contact area of the mounting may preferably be disposed in the upper region of the tool.

By virtue of such an arrangement the entire lower region thereof becomes available as a contact area for the support of the head relative to the cutting pressure components acting on it.

Desirably, the protuberance and the recess extend over the entire width of the turning tool. A particularly strong clamping engagement between head and mounting is thus ensured. In a advantageous embodiment the ridge and the protuberance are in mutual contact along a forward surface of the protuberance.

Preferably the protuberance is truncated to leave a space in the bottom of the recess, and also formed such that when in position, there is a small gap between the protuberance and the face of the recess remote from the cutter edge, to ensure intimate contact between the faces nearest the cutter edge.

Desirably a keying member is disposed between the head and the mounting to limit lateral sliding motion between the head and the mounting. This keying member is preferably formed by a member firmly located in the head or more preferably in the mounting and projecting into a corresponding cavity in the other component. The keying member may be of such dimensions as to simultaneously render it capable of absorbing a specific pressure (e.g., thrust pressure) exerted during use. Provision may desirably be made for the keying member to be disposed in the region of mutual contact between the head and the mounting.

The head and mounting may be interconnected by at least one bolt acting between the contact faces of the head and the protuberance. Preferably this bolt will be parallel to the bisector of the angle between the contact surfaces of the head contact face and the protuberance contact face.

The contact faces between mounting and head are preferably at an angle of 30° to 60° to the operative component of the principal cutting pressure.

According to a second aspect of the present invention the cutting edge is integrally disposed on a cutter body, the shape of said cutter body resembling two back-to-back assembled wedges, forming a body having two mutually remote edges, a first of which edges forms the cutting edge and the two wedge flanks meeting at said first edge forming the chip surface and the free surface, and the other wedge having a second of said remote edges serving as clamping portion.

Preferably the second edge of the wedge forming the clamping portion is flattened off so as to form a reaction pressure bearing surface. Thus the clamping portion wedge has substantially the shape of a four-sided prism.

Suitably the cutter body is mounted within the head with the reaction pressure bearing surface located downwardly from the cutting edge, and bearing against a corresponding surface of the head. The free flank of this wedge may be acted upon by a tensioning member which is adapted to be clamped to the head. It is contemplated for the tensioning member preferably to have substantially the shape of an obtusely angled wedge, and for a bolt securing the tensioning member to extend substantially in the direction of the angle bisector between the wedge faces.

The support and contact surfaces of the cutter body and of the tensioning member are parts of an interposed cradle body releasably secured to the head and preferably made of high-alloyed hot forged steel. This cradle is readily replaceable, being secured to the head by at least one fixing bolt.

In order that the present invention may more readily be understood the following description is given merely by way of example, reference being made to the accompanying drawings, in which.

Figure 1:
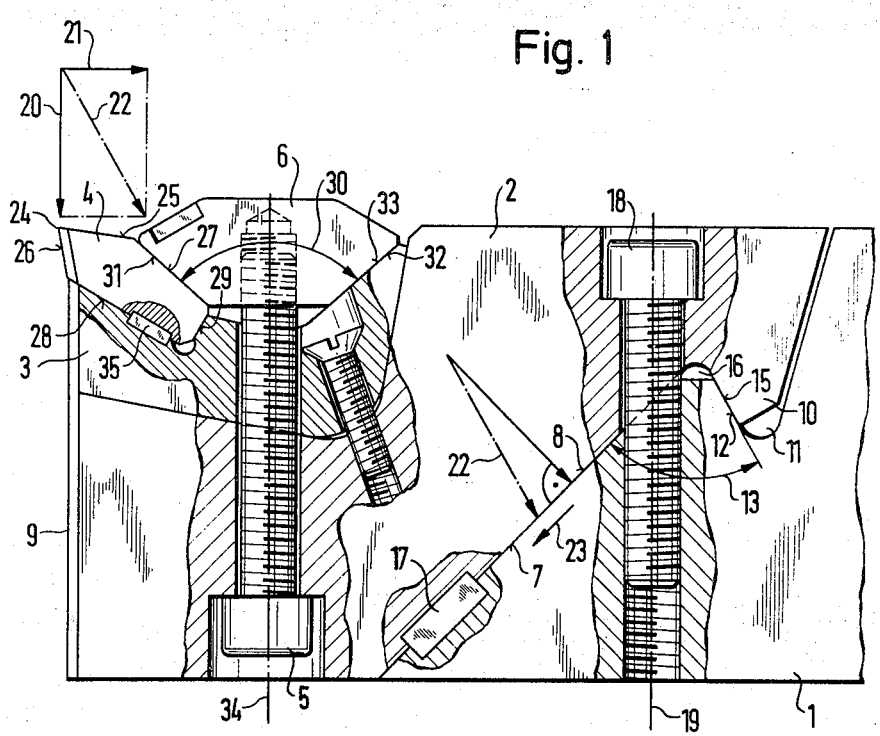
FIG. 1 is a side view of a plunge-cutting turning tool.

The turning tool essentially comprises a mounting 1, a head 2, an interposed cradle body 3 and a cutter body 4. The cutter body 4 is clamped in the cradle 3 by the tensioning member 6 clamped to the head 2 by a clamping bolt 5 threaded upwardly into the member 6 to leave an uninterrupted upper surface to the tensioning member to permit ease of removal of swarf.

Contact surfaces 7, 8 between the head 2 and mounting 1 slope downwardly towards a forward end 9 of the mounting. An anchor-like protuberance 10 protruding beyond the contact surface 7 of head 2 fits into a corresponding recess 11 of the contact surface 8 of the mounting 1. Flank 12 of the protuberance 10 which faces the contact surface 8 forms an acute angle 13 of less than 90° with the contact surface 7. The protuberance 10 and the recess 11 are disposed in the upper region of the turning tool, and extend over the entire width 14 thereof.

The flank 12 of the protuberance 10 contacts the corresponding lateral surface of the recess 11. The ridge between the face 15 of the recess 11 and the contact surface 8 of the mounting 1 is truncated so as to leave a hollow between head 2 and mounting 1. A locking member 17 is disposed between the two contact surfaces 7, 8 of head 2 and mounting 1 respectively. This member may be formed by a protuberance firmly inserted into head 2 or mounting 1 and projecting with sliding fit into a corresponding recess of the other component. In the illustrated embodiment the member is constructed in the manner of a fitting spring.

Head 2 and mounting 1 are interconnected by the bolt 18 whose axis 19 extends parallel to the angle bisector between the contact faces 8 and 15.

The contact surfaces 7, 8 between head 2 and mounting 1 are at an angle of 30° to 60° to the direction of the principal cutting pressure component 20. The reaction pressure component is designated by the numeral 21 in FIG. 1 and the resultant of principal cutting pressure component and reaction pressure component by the numeral 22. Because of the inclination of the contact surfaces 7, 8 the protuberance 10 is, in use of the tool, subjected only to the tractive strain corresponding to component 23.

The cutter body 4 has substantially the shape, in cross-section, of two wedges fitted together back-to-back, the edge of one of these wedges forming a cutting edge 24, with two wedge flanks 25, 26 being the chip surface and the free surface respectively. The other wedge formed by flanks 27, 28 serves as clamping portion. The edge of this second wedge remote from the cutting edge 24, is flattened off to form a reaction pressure bearing surface 29. The flank 28 and the reaction pressure bearing surface 29 of the cutter body contact corresponding faces of the interposed body 3.

Figure 2:
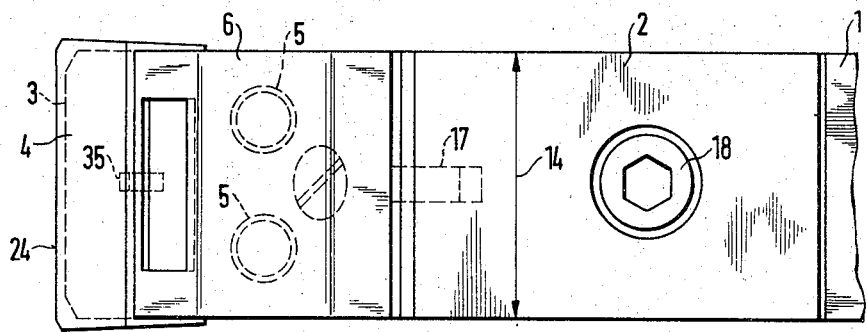
FIG. 2 is a plan view of the turning tool of FIG. 1.

The cutter body 4 is mounted in the cradle 3 in a position of upward inclination towards the cutting edge 24. The flank 27 of the cutter body 4 is acted upon by a tensioning member 6. The tensioning member 6 is in the form of a wedge having an obtuse wedge angle 30 whereof one wedge surface 31 lies on the free flank 27 of the cutter body and the other wedge surface 32 lies on a correspondingly inclined contact face 33 of the head 2 or the interposed body 3. The cutter body 4 is held between the tensioning member 6 and interposed body 3 by means of the clamping bolt 5, which also secures body 3 to head 2. In the illustrated embodiment two justaposed clamping bolts 5 are provided (FIG. 2).

The free surface of the tensioning member 6 is designed as chip breaker. The surface of the interposed member 3 which supports the flank 28 of the cutter body 4 may be provided with at least one locking member 35 protruding into a corresponding recess of the cutter body with sliding fit, to prevent cutter body 4 from being ejected due to pressure on its two converging flanks 27 and 28.

I claim:

1. A turning tool comprising: a mounting having a forward end; a first contact surface on the mounting sloping downwardly towards said forward end; means defining an upwardly facing recess in the mounting; a head; a second contact surface on said head engaging said first contact surface; a protuberance on said head engaging in said recess; and a cutter body attached to said head and including a clamping portion, a cutting edge, a chip surface and a free surface for said cutting edge, said cutter body having a shape resembling a first and a second back to back assembled wedge thereby providing a first and a second mutually remote edge the first of which forms the cutting edge, each wedge having two wedge flanks with the wedge flanks of said first wedge forming said chip surface and said free surface for the cutting edge, and the second wedge forming said clamping portion and having an upper free flank and a lower flank.

2. A turning tool according to claim 1, wherein said turning tool includes an upper region and a lower region of equal depth and wherein said recess and said protuberance are both disposed in said upper region.

3. A turning tool according to claim 1 and further comprising lateral edges to said head, and wherein said protuberance extends uninterruptedly between said two lateral edges.

4. A turning tool according to claim 1 wherein said mounting further includes an upwardly projecting ridge having two upwardly converging faces converging at an acute angle, said ridge being oriented to interlock with said head protuberance and said second contact surface.

5. A turning tool according to claim 4, wherein the ridge is truncated to define a space between the head and the ridge.

6. A turning tool according to claim 1, and further including a bolt interconnecting said head and said mounting, said bolt passing from said head to said mounting at a point forward of the protuberance.

7. A turning tool according to claim 1 and further comprising a keying member which is disposed between the head and the mounting to limit lateral sliding motion between the head and the mounting.

8. A turning tool according to claim 1, which in use is subject to a principal cutting pressure component and wherein said first and second contact surfaces are oriented at an angle of between 30° and 60° to the direction of said principal cutting pressure component.

9. A turning tool according to claim 1 wherein said second remote edge of said cutter body is flattened off so as to form a reaction pressure bearing surface.

10. A turning tool according to claim 9 wherein the head is supplied with a corresponding surface engaging said reaction pressure bearing surface of said cutter body; said cutter body being mounted within the head with the reaction pressure bearing surface located downwardly from the cutting edge.

11. A turning tool according to claim 10 and including a tensioning member bearing on the upper free flank of the clamping portion wedge of the cutter body thereby to enclose the cutter body between the tensioning member and the head.

12. A turning tool according to claim 11 wherein said tensioning member has first and second abutting faces mutually inclined at an obtuse angle, and said head includes a corresponding inclined abutting surface on which said first abutting face bears, said second abutting face bearing on the free flank of the clamping portion wedge.

13. A turning tool according to claim 12 and further including a bolt disposed to clamp said tensioning member to the head, said bolt lying substantially along a bisector of the angle between said mutually inclined abutting faces.

14. A turning tool according to claim 13 wherein said clamping bolt does not pass entirely through said tensioning member.

15. A turning tool according to claim 1 and further including a detachable cradle mounted within the head and releasably carrying the cutting edge.

16. A turning tool according to claim 15 and further including means to define a recess in said cutter body, and a keying member firmly located in said cradle to engage in said recess.

17. A turning tool according to claim 15 and further including locking means to anchor said cradle in said head.

18. A turning tool according to claim 1 and further including means to define a recess in said cutter body and a keying member firmly located in said head to engage in said recess.

* * * * *